United States Patent

Nicolai et al.

[11] Patent Number: 5,986,417
[45] Date of Patent: Nov. 16, 1999

[54] SENSORLESS UNIVERSAL MOTOR SPEED CONTROLLER

[75] Inventors: Jean Nicolai, Chateauneuf-le-Rouge; Alain Bailly, Simiane Collongue, both of France

[73] Assignee: SGS-Thomson Mocroelectronics S.A., Saint Genis, France

[21] Appl. No.: 08/637,830

[22] Filed: Apr. 25, 1996

Related U.S. Application Data

[60] Provisional application No. 60/007,761, Jan. 11, 1996.

[30]   Foreign Application Priority Data

Apr. 26, 1995 [FR] France ................................. 95 05011

[51] Int. Cl.$^6$ ........................................................ H02P 1/24
[52] U.S. Cl. ........................... 318/245; 318/798; 318/815; 318/439
[58] Field of Search ..................... 318/798, 815, 318/245, 439, 25, 138, 66, 71, 714

[56]   References Cited

U.S. PATENT DOCUMENTS

| 4,266,177 | 5/1981 | Nola | 318/810 |
|---|---|---|---|
| 4,527,101 | 7/1985 | Zavis et al. | 318/245 |
| 4,673,860 | 6/1987 | Machuron | 318/812 |
| 4,958,118 | 9/1990 | Pottebaum | 318/727 |
| 5,440,219 | 8/1995 | Wilkerson | 318/802 |
| 5,736,828 | 4/1998 | Turner et al. | 318/701 |
| 5,760,553 | 6/1998 | Astic et al. | 318/244 |

FOREIGN PATENT DOCUMENTS 3512438   11/1985   Germany .

Primary Examiner—William M. Shoop, Jr.
Assistant Examiner—Kim Lockett
Attorney, Agent, or Firm—Wolf, Greenfield & Sacks, P.C.

[57]   ABSTRACT

A circuit and method for controlling the speed of a universal motor driven by an AC source is disclosed. The method includes the steps of measuring a value of a temporal property of a current through the motor and determining a speed of rotation of the universal motor using the temporal property. The method for controlling the speed of the universal motor further includes comparing the determined speed of rotation with a desired speed of rotation and adjusting the current through the motor so that the speed of the motor approaches the desired speed of rotation.

34 Claims, 3 Drawing Sheets

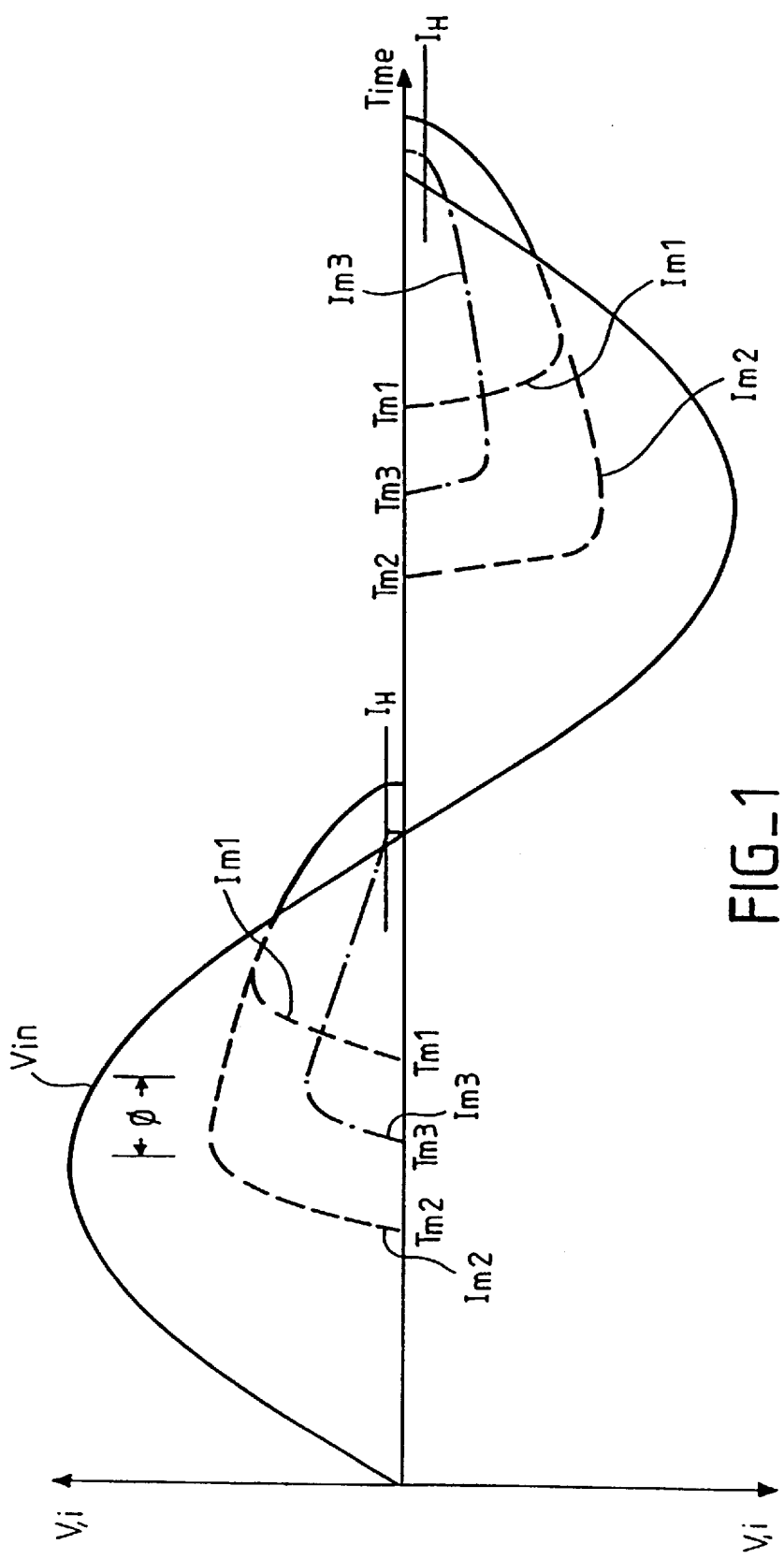
FIG_1

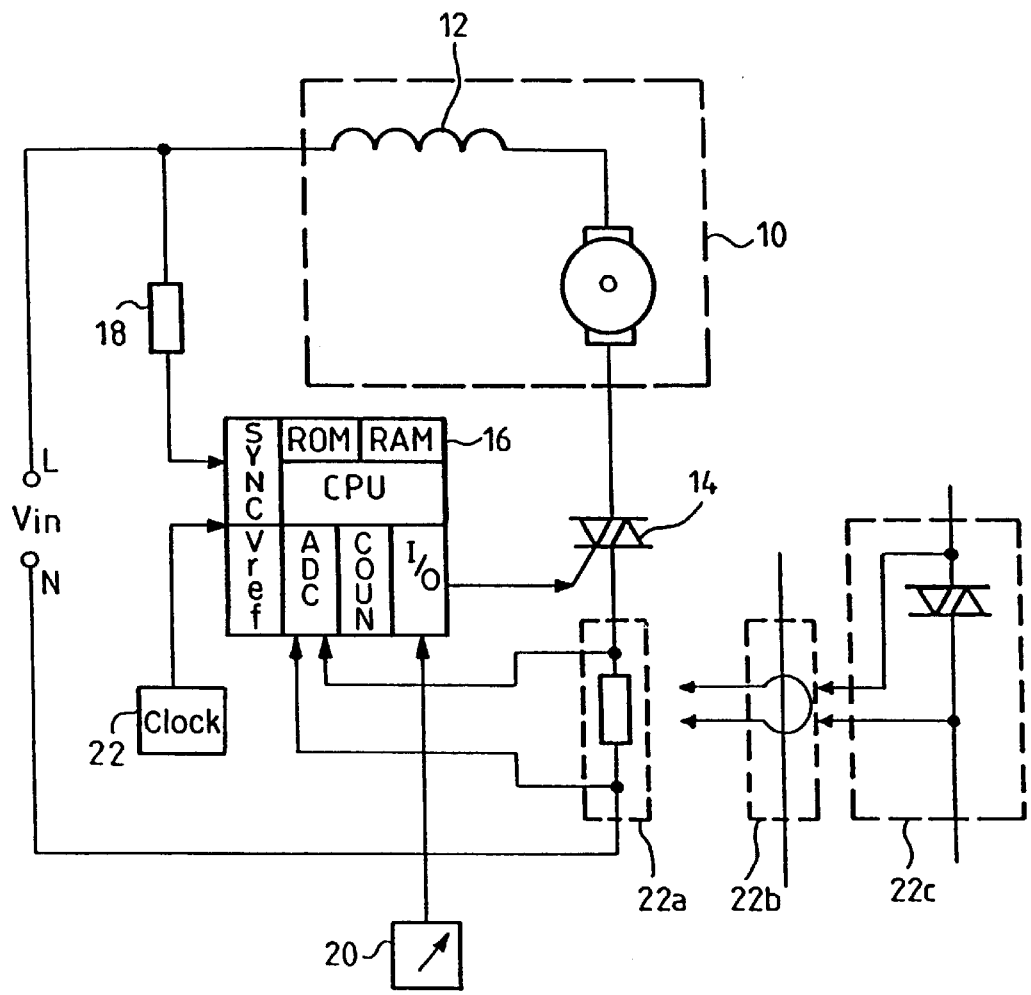
FIG_2

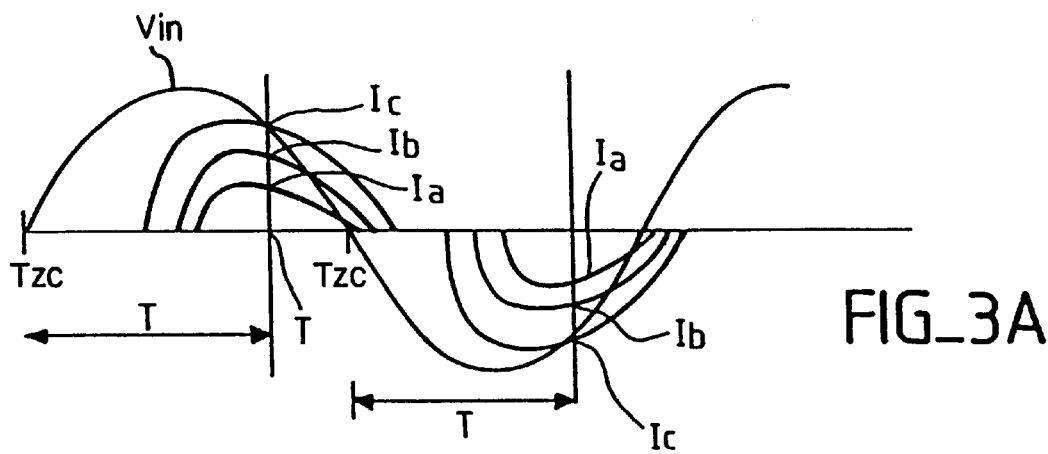
FIG_3A
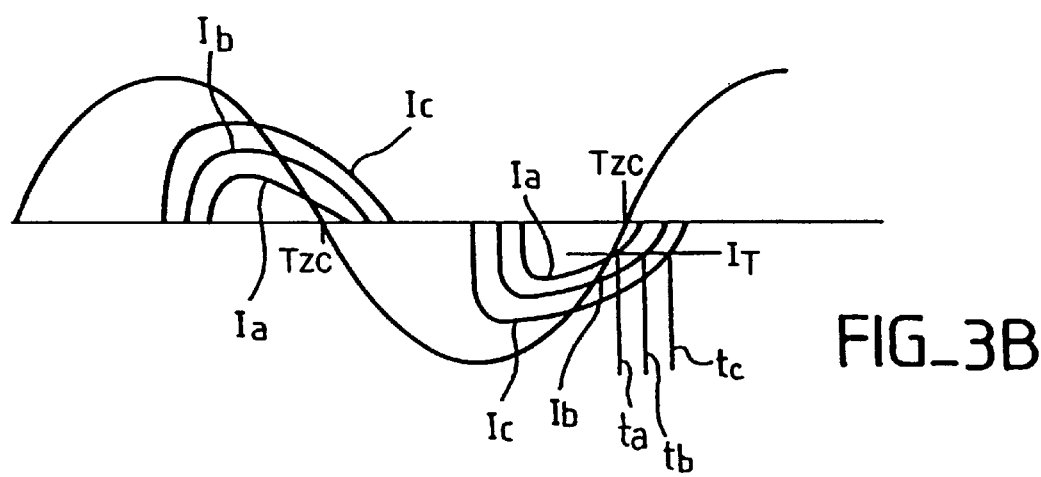
FIG_3B
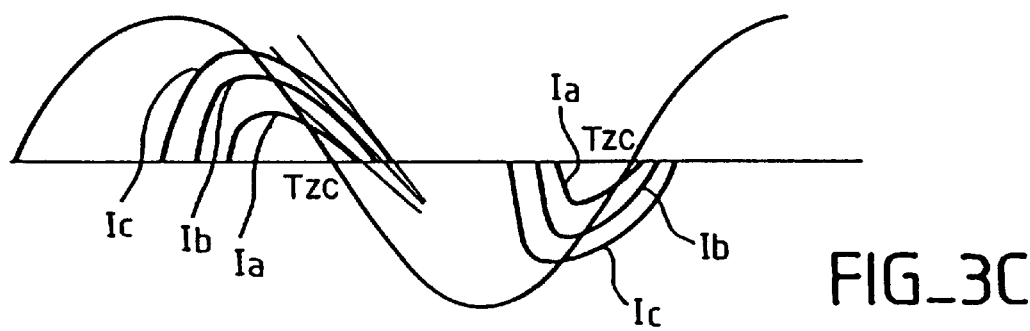
FIG_3C
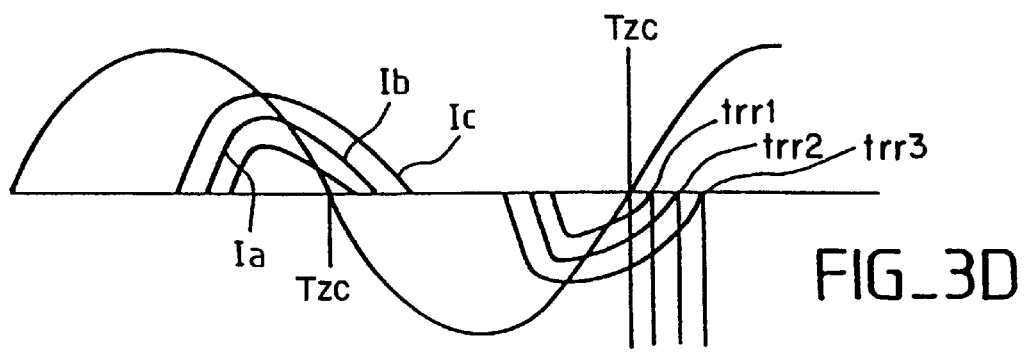
FIG_3D

SENSORLESS UNIVERSAL MOTOR SPEED CONTROLLER

This application claims benefit of provisional application Ser. No. 60/007,761 filed Jan. 11, 1996.

FIELD OF THE INVENTION

The invention relates to the field of the control of the speed of electric motors, more particularly to the control of the speed of universal motors supplied with an AC voltage.

BACKGROUND OF THE INVENTION

It is commonly required to control or regulate the speed of electric motors in equipment such as electric drills, washing machines or vacuum cleaners. The speed should be kept approximately constant, regardless of the mechanical loading of the motor. In such domestic applications, highly accurate motor speed measurement and control is unnecessary.

Known motor speed control circuits fall into two categories. Firstly, they may use open loop control, in that they control the power input to a motor, but have no feedback to determine actual motor speed, and thus are very ineffective, especially when the mechanical load on a motor may change during use. Secondly, they may use a mechanical feedback sensor, such as an optical disk or a magnet, in communication with an optical or magnetic sensor, to measure the speed of rotation of an electric motor. These sensors are expensive, and require a complex installation. The physical alignment of sensors must be accurate, and may require adjustment during installation, which makes the use of speed controlled universal motors costly and complex.

Universal motors powered by an AC voltage may be phase controlled by supplying timed gate pulses to a triac, connected in series with the universal motor. One triac gate pulse per half cycle is supplied, at a certain point in the half cycle. This turns the triac on and supplies current to the universal motor for a portion of each AC half cycle. In response to the measured speed of rotation, the certain point may be adjusted to supply current to the universal motor for a longer or shorter portion of the AC half cycle.

Universal motors may be used indifferently with DC or AC voltages. They have the following electrical characteristics. The instantaneous current i through the universal motor is related to the voltage u across it by the equation:

$$i = u/(R_f + K_v \cdot V) \quad \text{I}$$

where Rf is the resistance of the field winding, V is the speed of rotation of the universal motor, and Kv is a constant depending on the windings and the geometry of the particular universal motor. A universal motor therefore has a resistive characteristic, the equivalent resistance depending on the speed of rotation V of the universal motor. When used with an AC supply voltage, the current flowing in the universal motor becomes out of phase with the applied AC voltage, due to the inductance of the windings of the universal motor.

SUMMARY OF THE INVENTION

An object of the current invention is to provide a method for controlling the speed of a universal motor without using a mechanical feedback sensor.

A further object of the current invention is to provide a circuit for controlling the speed of a universal motor which is simple to install.

A further object of the current invention is to provide a circuit for controlling the speed of a universal motor that requires no adjustments or modifications to the universal motor during installation.

Accordingly, the one embodiment of the present invention provides a method for controlling the speed of a universal motor driven by an AC source, by phase controlling the current through the universal motor. The method further includes the steps of measuring a value of a temporal property of a waveform of the current to determine the speed of rotation of the universal motor, comparing the measured value of the temporal property to a predetermined value, and adjusting the phase control to cause the measured value of the temporal property to approach the predetermined value.

The method may further include the step of selecting the predetermined value from a number of stored values.

The method may further comprise the step of selecting the predetermined value from a number of stored values.

The measured property may be one of: the instantaneous current flowing at a predetermined point in time during the AC cycle; the instantaneous current flowing at a voltage zero crossing point in an AC cycle; the rate of decrease of the current at a certain time near the end of current conduction during each AC half cycle; the time between a voltage zero crossing point and the end of current conduction during each AC half cycle; or the time between a voltage zero crossing point and the current attaining the predetermined value.

The predetermined value may be determined as a function of the level of the phase control.

Another embodiment of the present invention includes a circuit for the control of the speed of a universal motor driven from an AC voltage. The circuit includes a phase control component in series with the universal motor and a current sensing means for measuring the current flowing through the universal motor. The circuit further includes means for measuring a current, in order to measure a value of a temporal property of a waveform of the current flowing in the universal motor and a pulse generating circuit for generating control signals to the phase control component. The circuit further includes a timing circuit for timing the control signals with respect to the AC voltage cycle, a reference circuit for indicating a predetermined value of a temporal property of a waveform of the current through the universal motor and a control circuit for controlling the timing circuit to cause the measured value of the temporal property to approach the predetermined value.

The predetermined value may be selected from a number of stored values.

The pulse generating circuit, the timing circuit, the measuring circuit, the control circuit and the reference circuit may, preferably, be replaced by a microcontroller including a synchronization input, an analog to digital converter, a counter, a voltage reference, an input/output circuit, a central processing unit and a non-volatile memory.

BRIEF DESCRIPTION OF THE DRAWINGS

Certain embodiments of the current invention will be described, by way of example, with reference to the accompanying diagrams, wherein:

FIG. 1 shows typical voltage and current waveforms for a universal motor operated with an AC supply, under various operating conditions;

FIG. 2 shows a circuit according to an embodiment of the invention; and

FIGS. 3A to 3D show typical voltage and current waveforms for a universal motor operated with an AC supply, under various operating conditions, illustrating speed measurement methods according to alternative embodiments of the current invention.

DETAILED DESCRIPTION OF THE PREFERRED EMBODIMENTS

In FIG. 1, an AC voltage Vin is shown along with various currents Im1, Im2, Im3 flowing in a phase controlled universal motor and supplied with Vin, under various operating conditions. The currents are phase lagging the applied voltage Vin by an amount φ, due to the inductance of the universal motor. At a given speed, the average current is proportional to the average voltage.

The current Iml is the current flowing in the universal motor when running at a relatively low speed, such as 2000 rpm, at a relatively low mechanical load, such as 3 Nm.

The current Im2 is the current flowing in the universal motor when running at the same relatively low speed, but with a higher mechanical load, such as 10 Nm. The current Im3 is the current flowing in the universal motor when running at a higher speed, such as 500 rpm, at a relatively low mechanical load, such as 3 Nm. At times Tm1, Tm2, Tm3 in each half cycle, a control pulse is applied to the phase control component, such as a triac, which begins to conduct. Although the instantaneous current that will flow is in principle proportional, and phase shifted, to the applied instantaneous voltage, some deformation of the current waveform may be expected, due to the inductance of the circuit, parasitic capacitance and series resistance. There will be a finite slope to the initial increase of current following the turning on of the triac, followed by a certain overshoot, then settling to a value proportional to the instantaneous voltage. This is visible, for example, in the Current Im1. As the current diminishes, at the end of each half cycle, the current will fall below the minimum holding current IH of the triac, and the current Im1, Im2, Im3 will stop abruptly.

It can be seen that, for a fixed speed, the instantaneous current is proportional to the applied voltage, Vin, but the duration of application of the current is longer for a universal motor driving a higher mechanical load. For a motor being driven at a higher speed, the instantaneous current is lower, but the duration of application of the current is longer to drive a given mechanical load.

From equation I presented above, it can be seen that the instantaneous current flowing through a universal motor (during a part of the period of conduction of the triac) depends only on the speed of rotation of the motor, and certain constants, when the motor is supplied with a voltage of a constant value (such as the AC mains supply). Thus, for any given universal motor, only the value of the instantaneous current is needed to enable the speed of rotation to be deduced.

FIG. 2 shows a universal motor speed control circuit according to the invention. A universal motor 10 including an inductive winding 12 is connected through a triac 14 to two terminals L, N, receiving an AC supply voltage Vin. One of the terminals, N, is taken as a ground reference voltage. Control signals are sent to the triac by a microcontroller 16. The microcontroller contains a voltage reference Vref, an analog to digital converter ADC, a counter COUN, Input/Output circuitry I/O, a synchronization input circuit SYNC, a central processing unit CPU, random access memory RAM and non-volatile memory ROM, interconnected amongst themselves. A resistor 18 connects a synchronization input of the microcontroller to the supply voltage. A control switch 20, which may be manually adjustable, for example, sends speed selection signals to the input/output circuitry I/O of the microcontroller.

Analog to digital converter ADC receives current information from a current sensor connected in series with the triac 14 and the universal motor 10. The current sensor may take one of several forms. For example, it may be a series resistor 22a of known value, the voltage across the terminals indicating the current flowing. It may be a magnetic pickup 22b in the form of a winding around the conductor connecting the N terminal to the triac 14, the intensity of the magnetic field indicating the current flowing. It may simply be connections, 22c allowing a voltage across the triac to be measured. A clock signal generator 22 is provided to supply a clock signal to the microcontroller 16. In practice, this clock signal generator may be integrated into the microcontroller 16. A DC supply voltage, preferably derived from the AC supply Vin, is supplied to the microcontroller 16, and the clock signal generator 22, but is omitted from the diagram for clarity.

During operation, control gate pulses are supplied, one per half cycle of the AC voltage Vin, to the triac 14 by the I/O circuitry of the microcontroller, in response to a required speed indicated to I/O by the operation of control switch 20. The temporal properties of the waveform of the current flowing through the universal motor and the triac are measured by ADC, by comparison with a reference voltage supplied by Vref. This measurement may be repeated once or many times per half cycle of Vin. The measurements are timed by counter COUN counting cycles of the clock signal supplied by 22. The values of the measured temporal property may be stored in the memory RAM. Synchronization to the AC half cycles is achieved by the synchronization circuit SYNC, receiving a representation of Vin from resistor 18. The central processing unit CPU acts according to instructions and data in the non-volatile memory ROM, responding to the measured values of the temporal properties of the waveform of the current, to adjust the timing of gate signals to the triac, to achieve and maintain the required speed of the motor.

As the voltage Vin is fixed, at say 220 Vrms, and the microcontroller 16 will only be used with one particular motor 10, values of Vin, Rf and Kv may be stored in ROM.

FIGS. 3A to 3D show, figuratively, current waveforms flowing in a universal motor operated at three different speeds, under a constant applied AC voltage Vin. Different properties of the current waveforms are highlighted, according to various embodiments of the current invention.

The embodiments of the invention described below show, in a general manner, that the temporal properties of the waveform of the current flowing through the motor during an AC cycle are used to determine the operational parameters of the motor.

In a first embodiment of the invention, referring to FIG. 3A, a current measurement may be made at a certain fixed point T in each half cycle of Vin. This fixed point T is measured by counter COUN counting periods of the clock signal since a previous voltage zero crossing point Tzc, detected by synchronization circuit SYNC. The counter COUN may be preset at each AC half cycle. With fixed u, Rf and Kv, the relationship between the instantaneous current at a fixed point T and the speed of rotation allows microcontroller 16 to calculate the actual speed of rotation. The series resistor 22a or magnetic 22b current detector may be used to measure an absolute value of current. The actual speed is compared by microcontroller 16 to the required speed of rotation, and the timing of the gate pulses to the triac 14 is adjusted accordingly. Advancing the pulses will speed up the motor; retarding the pulses will slow down the motor.

The speed of rotation V of the motor is calculated as:

$$V = (V_p \sin w.T)/(K_v.I(T)) - R_f/K_v \qquad \text{II}$$

where $V_p \sin w.T$ is the instantaneous value of the voltage Vin at time T, w being the angular frequency, and $V_p$ the peak value, of Vin. For a given motor, $R_f$ and $K_v$ are known, and for a known $V_p \sin w.T$ (a given T and known w, $V_p$), the speed of rotation V may be calculated from equation II as a function of I(T)–the instantaneous value of current through the motor at time T. The equation II is only approximate. The inductance 12 of the motor 10 is ignored. This is of no importance for the first four embodiments of the invention described in relation to FIGS. 3A, 3B, 3C, but will be considered in the fifth described embodiment.

In a second embodiment of the invention (not illustrated), the fixed point coincides with the voltage zero crossing point. This leads to simpler measurement by the microcontroller, as no delay from the zero crossing point needs to be counted. The series resistor 22a or magnetic 22b current detector may be used to measure an absolute value of current. Again, the actual speed is compared to the required speed of rotation, and the timing of the gate pulses to the triac 14 is adjusted accordingly.

In a third embodiment of the invention, referring to FIG. 3B, it is shown that the three current values Ia, Ib, Ic pass through a given value It at three different times ta, tb, tc. Thus, measurements of current may be repeatedly made from the moment of application of a triac pulse and compared to the given value It, to detect times ta, tb, tc. From the measured times ta, tb, tc, and knowing It, the speed of rotation of the motor may be calculated, according to equation II, above. This speed V may then be compared to the required speed of rotation. The series resistor 22a or magnetic current detector 22b may be used. The elapsed time ta, tb, tc since the previous voltage zero crossing point is counted by counter COUN. The timing of the gate pulses to the triac 14 is adjusted accordingly.

In a fourth embodiment of the invention, referring to FIG. 3C, the rate of decrease of the current just before the triac ceases to conduct, at the end of each current half-cycle, is measured at a certain time ts. This rate of decrease is also a temporal property of the waveform of this current, and of the speed of rotation of the universal motor. For this method, the equation I may be differentiated to obtain:

$$(di/dt) = (w.V_p \cos w.ts)/w(R_f + K_v.V) \qquad \text{III}$$

In this equation III, the numerator is known, so the instantaneous slope, di/dt, of the current i at time ts is a function of the speed of rotation V. As ts is known, being imposed by counter COUN, calculation of V from a measured slope is relatively simple. Alternatively, a look-up table may be stored in ROM to give a direct output of V for a known di/dt. Such a look up table may equally be stored for the other embodiments of the invention described.

The series resistor 22a or magnetic current sensor 22b may be used to measure the current i. By storing a sequence of current values during a fixed portion of each half cycle, for example during 1 ms around each time ts, for example each voltage zero crossing point, the current gradient may be determined by CPU. In the latter case, the instant ts is the voltage zero crossing point Tzc. From this current gradient, the speed of rotation of the universal motor may be deduced, compared to the required speed of rotation, and the timing of the triac pulses adjusted accordingly.

In a fifth embodiment of the invention, referring to FIG. 3D, the time at which the triac ceases to conduct varies with the magnitude of the current in the preceding half cycle. So, this time trr1, trr2, trr3, varies with the speed of rotation of the motor. In this fifth method, the inductance 12 is no longer ignored, and indeed causes the effect whereby the current ceases only after the voltage zero crossing point Tzc. The time between the voltage zero crossing point Tzc and the end of conduction is known as the recovery period. To measure it, the microcontroller 16 may continually measure the current from the time of application of a gate pulse to the triac, or from a zero crossing point Tzc. Once this current is measured as zero, or below a certain low threshold value, the time elapsed is stored. As, in this case, only the presence or absence of a current is required, the simple connection 22c, may be used as current sensor.

The time elapsed may be used with a look up table in ROM to determine the actual motor speed, and thus enable the timing of triac pulses to be adjusted to cause the measured speed of the motor to approach the requested speed. The equation embodied in such a look-up table will be:

$$i(t) = (-\exp(-k(t-td)/M))(B \sin w.td + C \cos w.td) + B \sin w.t + C \cos w.t \qquad \text{IV,}$$

where: $k = R_f + K_v.V$; td is the instant of application of a gate pulse during a half cycle; M is the value of inductance 12; $B = k.V_p/D$; $C = -M.w.V_p/D$; and $D = k^2 + M^2.w^2$.

At low power, the triac turn on time approaches the recovery period. The current flowing does not fully develop before the voltage zero crossing point. The recovery time becomes shortened. As the triac turn on time approaches the next voltage zero crossing point, the recovery time approaches zero, independently of the actual motor speed. This effect may be taken into consideration by the microcontroller, by including values of turn-on time in its calculation of phase control and triac gate pulse timing. Although this effect may be calculated, it may also be determined empirically and stored in a look up table.

As discussed above, the waveforms of the currents are not simply proportional to the applied voltage. The instantaneous current at a given point in the voltage half cycle may vary with the level of phase control, determined by the timing of the triac pulses. The look up tables stored in ROM may be designed also to compensate the motor control for such distortions of the current waveform. Also, nominally identical motors will have slightly different values of $R_f$ and $K_v$. In consumer applications, it is not economically possible to program individual microcontrollers to reflect an individual motor's characteristics. The speed regulation thus achieved will thus be imperfect.

However, according to the invention, speed regulation of a sufficient accuracy may be achieved without the need for costly and complicated mechanical speed feedback apparatus. In consumer applications, a speed regulation to an accuracy of 30% is often sufficient, and this accuracy may easily be provided by the method and circuit of the invention.

Although certain embodiments of the invention have been described by way of example, numerous variants will be apparent to those skilled in the art, without departing from the spirit of the invention. In particular, any temporal property of the current waveform other than those described may be used, provided that information as to the relative magnitude of the instantaneous current at some particular time can be deduced.

Also, any circuit that can measure such temporal properties and compare them to a predetermined value, and adjust the phase control signals accordingly, may be used. It is not necessary to use a microcontroller, although use of a microcontroller such as the ST6 from SGS-THOMSON Microelectronics provides a simple and cost effective solution.

Although the embodiments described use a triac as phase controlling element, any other component able to perform phase control may be used. These may exhibit full wave or half wave control.

What we claim is:

1. A method for controlling a speed of rotation of a universal motor driven by an AC source, the method comprising the steps of:
   measuring a value of a temporal property of a current, to determine the speed of rotation of the universal motor:
   comparing the measured value of the temporal property to a predetermined value;
   adjusting the measured value of the temporal property so that it approaches the predetermined value; and
   selecting the predetermined value from a number of stored values.

2. The method of claim 1, wherein the measured temporal property is an instantaneous current flowing at a predetermined point in time during an AC cycle.

3. The method of claim 1, wherein the step of adjusting the current is performing by controlling a triac with variable phase.

4. The method of claim 1, wherein the step of measuring is performed by a microcontroller.

5. The method of claim 1, wherein the step of measuring is performed by a sensor which generates an analog sensing voltage, and which provides the voltage to an analog-to-digital converter.

6. A method for controlling a speed of rotation of a universal motor driven by an AC source, the method comprising the steps of:
   measuring a value of a temporal property of a current, to determine the speed of rotation of the universal motor;
   comparing the measured value of the temporal property to a predetermined value; and
   adjusting the measured value of the temporal property so that it approaches the predetermined value,
   wherein the measured temporal property is selected from the group consisting of:
     an instantaneous current flowing at a voltage zero crossing point in an AC cycle,
     a rate of decrease of the current at a certain time, during an AC half cycle,
     a period of time between a voltage zero crossing point and an end of current conduction, during an AC half cycle, and
     a period of time between a voltage zero crossing point and a point of time when the current attains a predetermined value.

7. A method for controlling a speed of rotation of a universal motor driven by an AC source, the method comprising the steps of:
   measuring a value of a temporal property of a current, to determine the speed of rotation of the universal motor;
   comparing the measured value of the temporal property to a predetermined value; and
   adjusting the measured value of the temporal property so that it approaches the predetermined value,
   wherein the predetermined value is determined as a function of the level of the phase control.

8. A circuit for the control of a speed of rotation of a universal motor driven from an AC voltage, comprising:
   a phase control component in series with the universal motor;
   a current detector for measuring a value of a temporal property of a current flowing through the universal motor;
   a timing circuit, connected to the pulse generating circuit, for timing the control signals with respect to the AC voltage cycle;
   a reference circuit for indicating a predetermined value of the temporal property of the waveform of the current through the universal motor;
   a control circuit for controlling the timing circuit to cause the measured value of the temporal property to approach the predetermined value; and
   a pulse generating circuit, responsive to the timing circuit, the reference circuit, and the control circuit, for generating control signals to the phase control component,
   wherein the predetermined value is selected from a number of stored values.

9. The circuit of claim 8, wherein the pulse generating circuit, the timing circuit, the measurement circuit, the control circuit and the reference circuit are replaced by a microcontroller including a synchronization input, an analog to digital converter, a counter, a voltage reference, an input/output circuit, a central processing unit and a non-volatile memory.

10. The circuit of claim 8, wherein the phase control component is a triac.

11. A method for controlling a speed of rotation of a universal motor driven by an AC source, the method comprising the steps of:
    measuring a value of a temporal property of a current, to determine the speed of rotation of the universal motor;
    comparing the measured value of the temporal property to a predetermined value;
    adjusting the measured value of the temporal property so that it approaches the predetermined value,
    wherein the step of adjusting the current is performing by turning on a component once per half-cycle of the AC source voltage.

12. A method for operating a universal motor from an AC power line supply voltage, without use of a positional sensor, comprising the steps of:
    (a.) repeatedly turning-on a component which applies voltage from the AC power line to the motor;
    (b.) monitoring the current through the motor, and measuring a value of a temporal property of the current through the motor, to determine a speed of rotation of the motor without use of a positional sensor: and
    (c.) dynamically controlling the turning-on step (a), in dependence on the measuring the value of the temporal property step, to maintain the speed of the motor at a desired value independently of the loading of the motor, wherein the temporal property is selected from the group consisting of:
      an instantaneous current flowing at a zero crossing point in the AC cycle,
      a rate of decrease of the current at an end of current conduction, during each half AC cycle,
      a period of time between a zero crossing point and an end of current conduction, during each half AC cycle, and
      a period of time between a zero crossing point and the current attaining a predetermined value.

13. The method of claim 12, wherein the component is a triac.

14. The method of claim 12, wherein the monitoring and measuring step is performed by a microcontroller.

15. The method of claim 12, wherein the component is turned on once per half-cycle of the power line voltage.

16. The method of claim 12, wherein a sensor generates an analog sensing voltage, and wherein the method further includes comparing the analog sensing voltage against a reference voltage to determine the value of the temporal property.

17. The method of claim 12, wherein a sensor generates an analog sensing voltage, and provides the voltage to an analog-to-digital converter.

18. The method of claim 12, wherein the temporal property is an instantaneous current flowing at a predetermined point in time during the AC cycle.

19. A motor system, comprising:
   a universal motor;
   a sensor which is operatively connected to the motor, and which provides an output which indicates the instantaneous current flowing through the motor;
   a component which selectably applies voltage from a power line to the motor;
   control circuitry operatively connected to control the component and to receive the output of the sensor, the control circuitry being connected to measure a temporal property of the output of the sensor and to control the component in dependence on the temporal property,
   wherein the sensor generates an analog sensing voltage, and wherein the analog sensing voltage is compared against a reference voltage.

20. The system of claim 19, wherein the component is a triac.

21. The system of claim 19, wherein the control circuitry comprises a microcontroller.

22. The system of claim 19, wherein the component is turned on once per half-cycle of the power line voltage.

23. A motor system, comprising:
   a universal motor;
   a sensor which is operatively connected to the motor, and which provides an output which indicates the instantaneous current flowing through the motor;
   a component which selectably applies voltage from a power line to the motor;
   control circuitry operatively connected to control the component and to receive the output of the sensor, the control circuitry being connected to measure a temporal property of the output of the sensor and to control the component in dependence on the temporal property,
   wherein the sensor generates an analog sensing voltage, and provides the analog sensing voltage to an analog-to-digital converter.

24. A motor system, comprising:
   a universal motor;
   a sensor which is operatively connected to the motor, and which provides an output which indicates the instantaneous current flowing through the motor;
   a component which selectably applies voltage from a power line to the motor;
   control circuitry operatively connected to control the component and to receive the output of the sensor, the control circuitry being connected to measure a temporal property of the output of the sensor and to control the component in dependence on the temporal property,
   wherein the temporal property is selected from the group consisting of:
      the instantaneous current flowing at a predetermined point in time during an AC cycle,
      the instantaneous current flowing at a zero crossing point in an AC cycle,
      a rate of decrease the current at an end of current conduction, during each half AC cycle,
      a period of time between a zero crossing point and the current attaining a predetermined value.

25. The system of claim 24, wherein the temporal property is a period of time between a zero crossing point and an end of current conduction, during each half AC cycle.

26. A circuit for the control of a speed of rotation of a universal motor driven from an AC voltage, comprising:
   a phase control component in series with the universal motor;
   a current detector for measuring a value of a temporal property of a current flowing through the universal motor;
   a timing circuit, connected to the pulse generating circuit, for timing the control signals with respect to the AC voltage cycle;
   a reference circuit for indicating a predetermined value of the temporal property of the waveform of the current through the universal motor;
   a control circuit for controlling the timing circuit to cause the measured value of the temporal property to approach the predetermined value; and
   a pulse generating circuit, responsive to the timing circuit, the reference circuit, and the control circuit, for generating control signals to the phase control component,
   wherein the phase control component is turned on once per half-cycle of the AC voltage.

27. A circuit for the control of a speed of rotation of a universal motor driven from an AC voltage, comprising:
   a phase control component in series with the universal motor;
   a current detector for measuring a value of a temporal property of a current flowing through the universal motor;
   a timing circuit, connected to the pulse generating circuit, for timing the control signals with respect to the AC voltage cycle;
   a reference circuit for indicating a predetermined value of the temporal property of the waveform of the current through the universal motor;
   a control circuit for controlling the timing circuit to cause the measured value of the temporal property to approach the predetermined value; and
   a pulse generating circuit, responsive to the timing circuit, the reference circuit, and the control circuit, for generating control signals to the phase control component,
   wherein the temporal property is selected from the group consisting of:
      an instantaneous current flowing through the motor at a predetermined point in time during the AC cycle,
      an instantaneous current flowing at a voltage zero crossing point in the AC cycle,
      a rate of decrease of the current at an end of current conduction, during an AC half-cycle,
      a period of time between a voltage zero crossing point and an end of current conduction, during an AC half-cycle, and
      a period of time between a voltage zero crossing point and a point of time when the current attains a predetermined value.

28. A method for controlling a speed of rotation of a universal motor driven by an AC source, the method comprising the steps of:

measuring a value of a temporal property of a current through the universal motor;

determining a speed of rotation of the universal motor using the measured value of the temporal property;

comparing the determined speed of rotation with a desired speed of rotation; and adjusting the current through the motor in response to the step of comparing, wherein the measured temporal property is selected from the group consisting of:

an instantaneous current flowing at a predetermined point in time during an AC cycle, an instantaneous current flowing at a voltage zero crossing point in an AC cycle, a rate of decrease of the current at a certain time, during an AC half cycle, and a period of time between a voltage zero crossing point and an end of current conduction, during an AC half cycle.

29. The method of claim 28, wherein the measured temporal property is a period of time between a voltage zero crossing point and a point of time when the current attains a predetermined value.

30. A method for controlling a speed of rotation of a universal motor driven by an AC source, the method comprising the steps of:

measuring a value of a temporal property of a current through the universal motor;

determining a speed of rotation of the universal motor using the measured value of the temporal property;

comparing the determined speed of rotation with a desired speed of rotation; and adjusting the current through the motor in response to the step of comparing, wherein the value of the temporal property includes a value of a temporal property of a waveform of the current.

31. A method for controlling a speed of rotation of a universal motor driven by an AC source, the method comprising the steps of:

measuring a value of a temporal property of a current, to determine the speed of rotation of the universal motor;

comparing the measured value of the temporal property to a predetermined value;

adjusting the measured value of the temporal property so that it approaches the predetermined value, wherein the step of measuring a value includes measuring a value of a temporal property of a waveform of the current.

32. A circuit for the control of a speed of rotation of a universal motor driven from an AC voltage, comprising:

a phase control component in series with the universal motor;

a current detector for measuring a value of a temporal property of a current flowing through the universal motor;

a timing circuit, connected to the pulse generating circuit, for timing the control signals with respect to the AC voltage cycle;

a reference circuit for indicating a predetermined value of the temporal property of the waveform of the current through the universal motor;

a control circuit for controlling the timing circuit to cause the measured value of the temporal property to approach the predetermined value; and a pulse generating circuit, responsive to the timing circuit, the reference circuit, and the control circuit, for generating control signals to the phase control component, wherein a value of a temporal property includes a value of a temporal property of a waveform of the current.

33. A method for operating a universal motor from an AC power line supply voltage, without use of a positional sensor, comprising the steps of:

(a.) repeatedly turning-on a component which applies voltage from the AC power line to the motor;

(b.) monitoring the current through the motor, and measuring a value of a temporal property of the current through the motor, to determine a speed of rotation of the motor without use of a positional sensor; and (c.) dynamically controlling the turning-on step (a), in dependence on the measuring the value of the temporal property step, to maintain the speed of the motor at a desired value independently of the loading of the motor, wherein measuring the value of a temporal property includes a measuring a value of a temporal property of a waveform of the current.

34. A motor system, comprising:

a universal motor;

a sensor which is operatively connected to the motor, and which provides an output which indicates the instantaneous current flowing through the motor;

a component which selectable applies voltage from a power line to the motor;

control circuitry operatively connected to control the component and to receive the output of the sensor, the control circuitry being connected to measure a temporal property of the output of the sensor and to control the component in dependence on the temporal property, wherein the temporal property includes a value of a temporal property of a waveform of the current.

* * * * *